United States Patent Office 3,079,195
Patented Feb. 26, 1963

3,079,195
VEHICLE ROOFS
Hans Golde, Frankfurt am Main, and Johannes Werner, Offenbach (Main), Germany, assignors to H. T. Golde G.m.b.H. & Co. K.G., Frankfurt am Main, Germany
Filed Oct. 6, 1959, Ser. No. 844,770
Claims priority, application Germany Nov. 18, 1958
17 Claims. (Cl. 296—137)

This invention relates to a roof including a fixed part and a movable part, particularly to a vehicle roof.

It is known to transmit drive to a sliding roof of a vehicle by way of cables which are rigid to axial force and which pass through two sliding roof guide rails extending in the longitudinal direction of the vehicle and disposed on opposite sides of the aperture in the fixed roof. Such cables are particularly advantageous for the remote transmission of an automatic drive, for example from an electric motor mounted in the rear part of the vehicle.

Furthermore, it has already been proposed to arrange, in the forward region of the fixed roof, driving devices such as hand cranks for operating the cables, drive being transmitted by ropes or chains in older constructions. However, arrangements of this kind are suitable only for large vehicles, such as buses and the like, in which sufficient room is available for operating a hand crank.

In the case of an ordinary motor car, the free room beneath that portion of the fixed roof between the windscreen and the sliding roof aperture is not always sufficient to allow a hand crank to be turned or sufficient to enable a motor-operated driving device to have a position in that region without the driving device, motor-operated or otherwise, obstructing other equipment, for example the interior mirror and the sun-visors, unless special transmitting members are used which permit the axis of the hand crank to be shifted rearwards with respect to the rope or cable drive.

Moreover, the conventional handles attached directly to the sliding roof have the disadvantage that they require a considerable amount of force to be applied for movement of the sliding roof, particularly when the sliding roof is being closed or braked. In addition, some force is required to overcome the friction resulting from the sealing of the gap between the sliding roof part and the guides.

According to the present invention, there is provided a roof, comprising a fixed roof part, portions of said fixed roof part defining an aperture therein, roof guide means disposed at opposite sides of said aperture and extending in the same direction as one another, a movable roof part mounted for displacement along said roof guide means in said direction, between an open position and a closed position in which said movable roof part completely closes said aperture, a driving device which is disposed at a fixed location adjacent that side of said aperture which is furthermost from the movable roof part when the latter is in its open position, said location being directly below the movable roof part when the latter is in its closed position, means at said location fixing said driving device with respect to said portions, cable means which are rigid to axial force, which engage with said driving device and which extend between said location and two respective locations on opposite sides of that centre line of the movable roof part extending in said direction, for transmitting driving force from said driving device to said movable roof part, means at said two respective locations connecting said cable means to said movable roof part, and cable guide means connected to said fixed roof part for guiding said cable means between said two respective locations on the one hand and said location on the other hand.

In order that the present invention may be clearly understood and readily carried into effect, reference will now be made, by way of example, to the accompanying drawings, in which.

Referring to FIGURES 1 to 9, the vehicle roof includes a fixed roof part 1 having an aperture in which is mounted a sliding roof part 19, the part 1 including a folded portion 2 for receiving the windscreen. The part 19 is arranged to move, along guide rails 18, between an open position and an almost-closed position, the rails extending along the fixed roof part. A conventional sun-visor 3 is provided and is mounted on a rod 4 about which the sun-visor can pivot, in the direction indicated by means of the arrow, between the inoperative position shown and an operative position. Inside the aperture is a frame, included in the fixed roof part and rigidly connected to the remainder of that fixed roof part. The frame has forward transverse portions 5 which, considering the cross-section, consist of a U-section which opens upwardly and forms a rain gutter 6, a U-section 7 which opens downwardly, and a horizontal flange 8.

The corner formed by the horizontal flange 8 and the adjoining vertical limb of the U-section 7 serves to receive a main part 20 of a drive case 9. Rotatably mounted in the case 9 is a spindle 10 of a hand crank. The spindle 10 is rigidly connected to a crank hub 11 on which a crank handle 12 is fixed. Positively connected to the pin 10, for example by radial teeth, is a driving gear-wheel 13 the teeth of which engage in a known manner corresponding recesses in two driving cables 14 and 15 which are guided so as to be rigid to force transmitted thereto by the gear-wheel 13. The cable recesses are shown on the protruding driving-cable end portions of FIGURES 2 and 3. Respective driving parts of the cables extend between a common location at the foremost edge zone of the aperture and two respective locations, which are situated at opposite sides of the sliding roof part adjacent the guide rails 18. The gear-wheel 13 is disposed at the aforementioned common location. Instead of the positive connection, and as protection against overloading, it is possible, for example, to interpose between the spindle 10 and the gear-wheel 13 a clutch arrangement which will give way if a predetermined torque is exceeded, such as a clutch arrangement of the kind described hereinafter in connection with FIGURES 18 and 19.

The main case part 20 has a cover 21, and the basic shape of the case part 20 is that of a U-sectioned channel, the channel having flanges 20' which adjoin at the front and are fastened to the U-section 7, for example by means of bolts.

The cover 21 has, projecting from its forward edge, a flange 21' which bears on the U-section 7 and fits into a recess between the two flanges 20', and, projecting from its rearward edge, a downwardly directed flange 21" which fits into a corresponding recess in the rearward side wall of the case part 20 and, at the same time, serves as a lateral guide for the cable 15. The cover 21 is fixed in a readily releasable manner to the U-section 7, for example by screws.

The inner surfaces of both case parts 20 and 21 form guide ducts for the cables 14 and 15. The lengthwise configurations of the guide ducts are shown more clearly in FIGURES 5 to 7. These guide ducts serve to guide the cables 14 and 15 smoothly past the gear-wheel 13, to keep the cables in engagement with the gear-wheel and to conduct the cable ends into further guide ducts in guide pieces 16 and 17.

Figure 3:
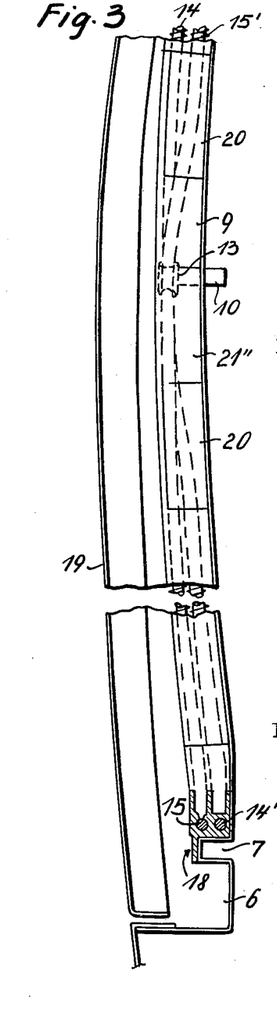
FIGURE 3 is a sectional view taken on the line III—III in FIGURE 2.
Figure 4:
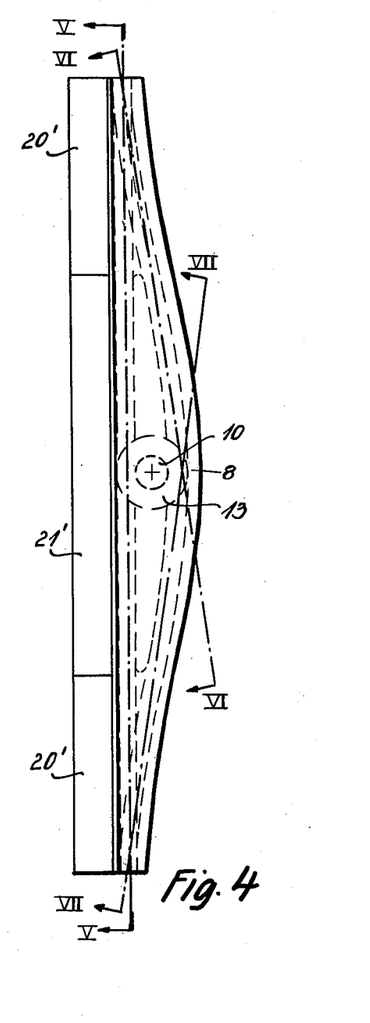
FIGURE 4 is a detail of FIGURE 2, but on a larger scale.
Figure 5:
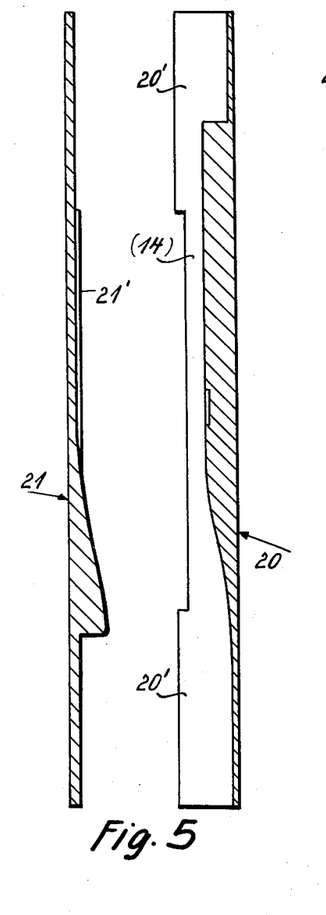
FIGURES 5, 6 and 7 are exploded sectional views taken on the lines V—V, VI—VI, and VII—VII, respectively, in FIGURE 4, but with certain members missing.
Figure 6:
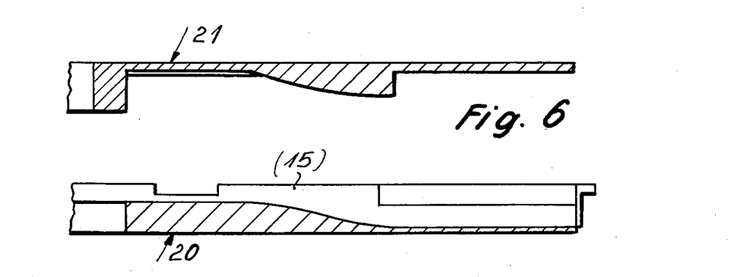
Figure 7:
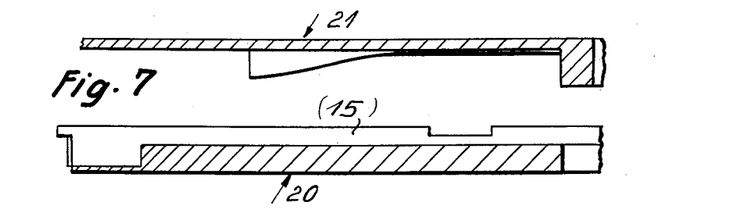

In order to achieve a reliable and uniform application of force to the sliding roof, it is necessary for the driving parts of the cables 14 and 15 to be guided at the same height for all of their lengths. Upper guide ducts of the guide pieces 16 and 17 are best suited for that purpose. In consequence, the driving part of the cable 14 is guided in the upper duct of the piece 17, whilst the driving part of the cable 15 runs in the upper duct of the piece 16. The guide surfaces on the inside of the case 9 guide an idle part 14' of the cable 14 into the lower duct of the piece 16 and an idle part 15' of the cable 15 into the lower duct of the piece 17, as FIGURE 3 shows.

Figure 1:
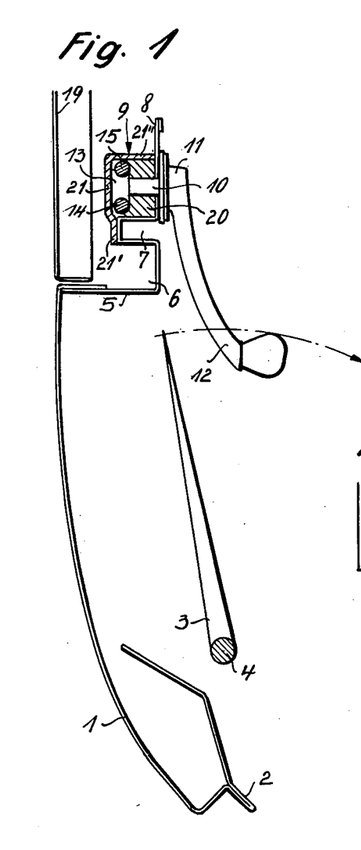
FIGURE 1 is a vertical, central, longitudinal, sectional view, taken on the line I—I in FIGURE 2, through the forward part of a vehicle roof.
Figure 2:
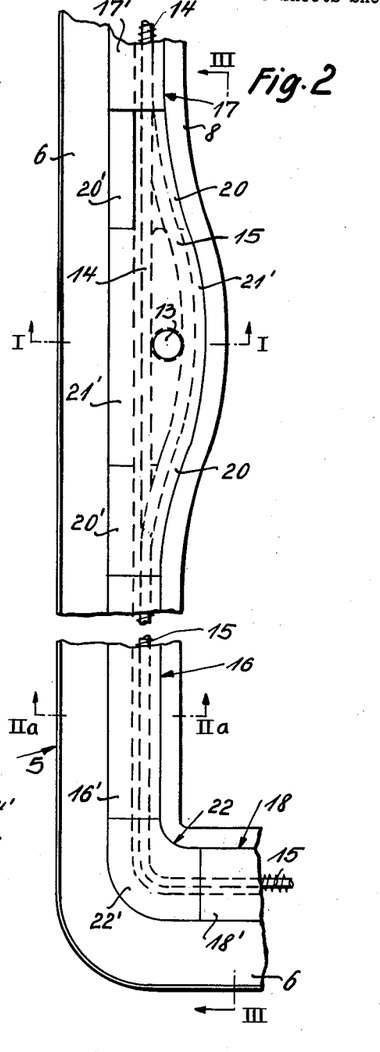
FIGURE 2 is a horizontal sectional plan view of two other parts of the vehicle roof.
Figure 2A:
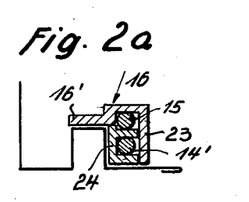
FIGURE 2a shows a sectional view taken on the line IIa—IIa in FIGURE 2.

Referring particularly to FIGURE 2a, the guide piece 16 is composed of two members 23 and 24, each being of open section releasably interconnected, so that the cables are readily accessible. The piece 17 and a corner piece 22 are correspondingly each composed of two open-section members.

The cable guides as a whole consist of the case 9, a series of metal pieces, such as the pieces 16, 17 and 22, and the known sliding-roof guide rails 18, the latter running longitudinally with respect to the roof. These known rails serve as cable guides and for that purpose have upper and lower guide ducts (see FIGURE 3).

Situated in an upper guide duct is the cable 15 with the idle part 15', whilst a lower guide duct receives the idle part 14' of the cable 14. Connected to the forward ends of the rails 18 are corner pieces, of which one is the piece 22, rounded to the same external profile, and these are followed by the pieces 16 and 17 respectively, all of the cable guides being provided with fastening flanges 18', 22', 16' and 17' which are fixed, for example by means of screws, to the horizontal wall of the U-section 7.

The length of the cables 14 and 15 is expediently so chosen that the free ends of the idle parts 14' and 15' always move to and fro in the guide ducts of the guide rails 18 so that the free ends cannot enter the corner guide pieces and become jammed therein. The idle parts can be integral with the driving parts of the cable or they can be made of another material, particularly a material having a low coefficient of friction.

Since the length of the cables is expediently so determined that the free ends remain in the guide rails 18, the friction of the four cable parts guided about the forward corners of the frame provides an adequate braking of the sliding-roof movement in all intermediate positions, so that, even in the event of violent accelerations, no accidental change of position occurs once the sliding roof has been set in a desired position. Even so, the reduction ratio within the drive case 9 can easily be so selected, for example by appropriate selection of the diameter of the driving wheel, that the frictional forces can be overcome without having to exert a considerable amount of force when opening and closing the roof part 19. In addition, there is no need for an additional braking device to arrest the sliding roof part. In order to protect the cable drive from overloading, it is possible, where appropriate, to interpose a suitable yielding clutch arrangement between the hand crank and the gear-wheel 13.

In order to adjust the driving lengths of the cables, the case cover 21 can be removed and the cable 15 can then easily be displaced away from engagement with the gear-wheel 13. Thus the cable 14 can be adjusted on its own by means of the hand crank whereafter the cable 15 can be adjusted manually and then caused to re-engage with the gear-wheel 13. Thereupon the case cover 21 can be screwed back into position. The fact that the cover 21 is readily detachable permits simple mounting of the gear-wheel 13.

Figure 8:
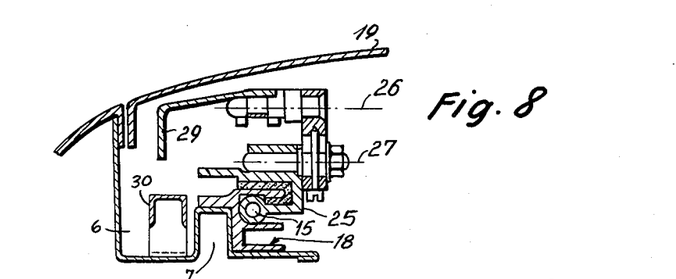
FIGURE 8 is a vertical, transverse, sectional view through a rearward part of the vehicle roof.
Figure 9:
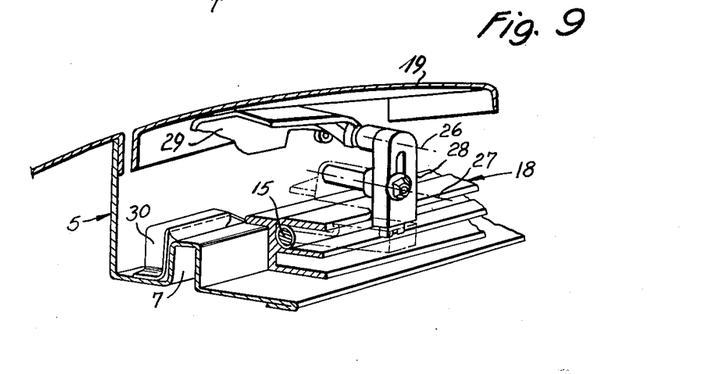
FIGURE 9 is a sectional view, in perspective, of substantially the part shown in FIGURE 8.

With reference to FIGURES 8 and 9, in order to lift and lower the rear of the roof part 19 between its almost-closed position, just below the aperture, and the fully closed position, two similar link devices are provided of which one is shown; these are disposed at opposite sides of the part 19. The device shown connects the cable 15 and the part 19, and includes a rear guide shoe 25 which slides along the guide rail 18 and is connected to the driving cable 15. The link device further includes two pivot pins 26 and 27 extending transversely to the guide rail 18, and a link member 28 which is pivotable on the two pins. The pin 26 is associated with the panel 19 and the pin 27 is associated with the guide shoe 25.

The link device can also take the form of a toggle joint, and is of particular use in the case of automatic sliding roof drives, for example those using electric motors.

FIGURES 8 and 9 show the sliding roof part 19 in the closed (i.e. raised) position. When operation of the hand crank rearwardly displaces the guide shoe 25 and thus the pin 27 (towards the right in FIGURE 9), at first the part 19 having the pin 26 is not displaced, but the pin 27 is displaced rearwardly so that the pin 26, together with the part 19, is drawn downwards and then the latter pin comes into a plane which passes through the axis of the pin 27 and is approximately parallel to the guide rail 18. Only then does further rearward sliding of the guide shoe 25 cause the pin 26 and the part 19 to move rearwardly towards the open position.

If the hand crank is then operated in the reverse sense so that the guide shoe 25 moves forwards (towards the left in FIGURE 9) along with the pin 27, first of all the pin 26 is not swung upwardly relative to the pin 27, since the pin 26 is situated in front of the pin 27 and in the dead centre position, so that the link device cannot act. Only when the almost-closed position is reached does a cam track 29 fixed to the part 19 run on to a ramp 30 arranged on the frame of the vehicle roof, whereby the pin 26 is lifted out of the dead centre position so that further movement of the guide shoe 25 under the action of the hand crank will then swing the pin 26 upwards into its uppermost position. As a result, the part 19 is raised into the closed position in which it forms a continuation of the fixed roof part. Since the lift of the ramp 30 amounts to only a fraction of the vertical displacement of the sliding roof during movement between the closed and the almost-closed positions, the ramp does not hinder the lowering of the sliding roof on movement of the latter out of the closed position. The link member 28, the effective length of which is adjustable, preferably turns through an angle of 90° on movement between the position it takes up when the part 19 is closed and the dead-centre position.

The link device shown in FIGURES 8 and 9 thus makes it possible to lift and lower the part 19 merely by displacing the guide shoe 25 along the guide rail 18, so that the part 19 can be operated from the crank handle 12 without involving the provision of special drive-transmitting devices for lifting and lowering the part 19. It will be appreciated that this link device is not restricted to use in vehicle roofs according to the present invention.

Figure 9A:
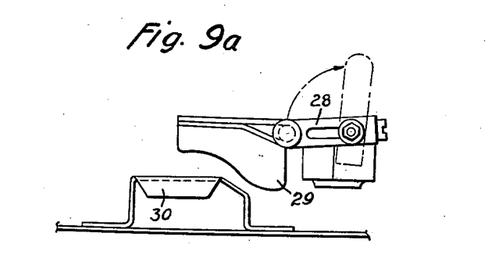
FIGURE 9a is a side view of the rearward vehicle-roof part shown in FIGURES 8 and 9.

FIGURE 9a shows the link device from the inner side, in a position when the sliding roof part 19 has been lowered shortly before the cam member 29 engages the ramp 30.

Figure 10:
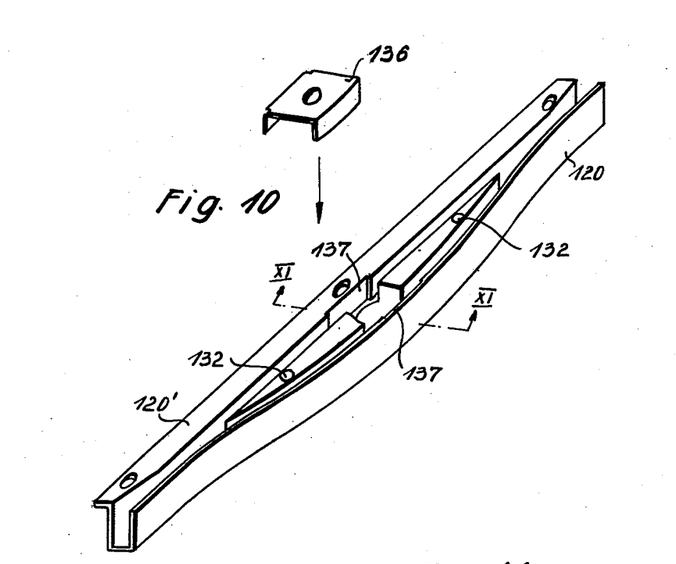
FIGURE 10 shows an exploded view, in perspective, of parts of a modified version of the vehicle roof.
Figure 11:
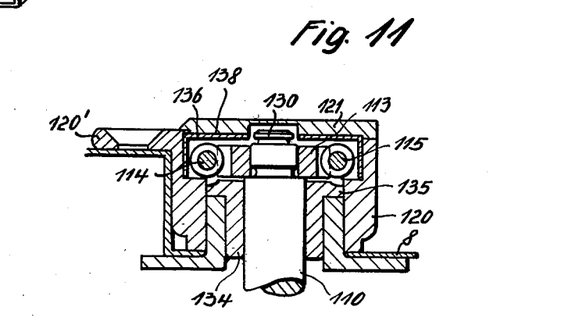
FIGURE 11 shows a sectional view, on a larger scale and taken on the line XI—XI of FIGURE 10, of the parts shown when assembled together with further parts of the roof.
Figure 12:
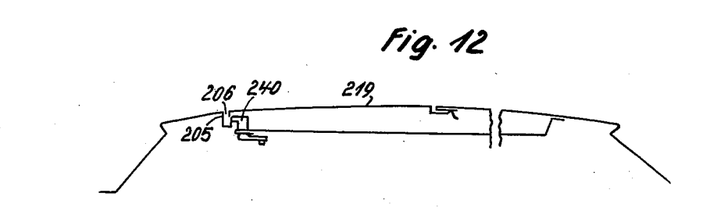
FIGURE 12 is a vertical, central, longitudinal, sectional view through a second modified version of the vehicle roof, and shows a sliding roof part in a closed position.

Referring to FIGURES 10 and 11, a drive case consisting of a main case part 120 and a case cover 121 is constructed so as not to be easily distortable. This is achieved by using a casting for the case, the two case parts being made of a light, corrosion-resistant metal, such as aluminium pressure castings or zink die castings. In this way, with only a simple manufacturing process being involved, the case is given adequate strength to prevent it from being deformed during use. At the same time, the case has sufficient toughness so as not to be damaged by vibrations during movement of the vehicle. It is easy and inexpensive to machine the castings.

Similarly to the version described with reference to FIGURES 1 to 9, the case part 120 has a fastening flange 120′ which can be fixed, for example by screws, to the inverted U-section of the roof frame which bounds the aperture.

The case part 120 is basically of U-section and the cover 121 is fixed thereto by means of screws (not shown) which are screwed into respective tapped holes 132.

Situated in the central portion of the case is a gear-wheel 113 which is fitted on to the upper end of a crank spindle 110 and secured thereto by means of a screw 130. The crank pin 110 is mounted in the lower portion of the case part 120 by means of a bearing bush 134 which, at its upper end, is formed with an annular flange 135 which is of hard material and projects beyond the driving gear-wheel 113 to locations at a distance from the driving wheel axis greater than the shortest distance between the cable axes and the driving wheel axis, so that, in the proximity of the gear-wheel 113, the cables run over hard surfaces.

Since it must be guaranteed that, during use, the cables 114 and 115 are at all times in reliable engagement with the driving wheel 113, it is necessary to prevent any lateral widening of the guide ducts provided in the main part 120 for the cables 114 and 115. This is prevented by means of a metal strip 136 which is in the shape of a trough without end walls, and also made of hard material, in this case spring steel. This strip 136 is inserted into the main part 120 with the vertical limbs of the strip entering in recesses 137 in the side walls of the part 120, there being a recess 138 in the cover 121 for receiving the base of the trough-shaped strip. The trough-shaped construction of the metal strip gives the advantage over liners in the form of laminae that the strip is much easier to fasten. Furthermore, the cables cannot wear away the relatively soft side walls of the part 120 and the cover. The screw 130 projects through a hole in the base of the liner.

With reference to FIGURES 12 to 15 and FIGURES 16 to 19, in those two versions adjustment of the driving and idle lengths of the cables is particularly simple, and the cables can be adjusted after the complete fixed-roof lining within the vehicle has been mounted, without necessitating the opening of the respective cover 221 or 321 of the drive case 220 or 320. Adjustment can advantageously be effected with the sliding roof fully closed so that an accurate reference position for adjustment is available. The important point is that the driving and idle lengths should be so adjusted that the sliding roof 219 or 319 abuts the fixed roof part in a sealed manner when in the closed position. In the foremost position of the sliding roof 219 or 319, however, it is not possible at all or only with great difficulty to remove the case cover 221 or 321, and to obtain access to cables 214 and 215 or 314 and 315, in order to adjust them.

Such simple adjustment of these cables is possible since a gear-wheel 213 or 313, together with its bearing parts 234 and 235 or 334 and 335, and possibly the driving part 252, or 360 to 365, form a further unit which is constructed so that it can be inserted between the cables transversely to the direction of movement of the cables.

Figure 13:
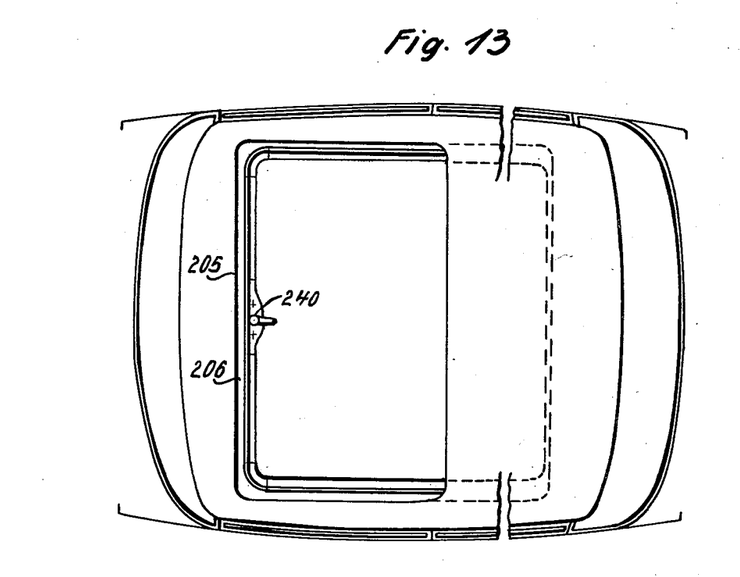
FIGURE 13 is a plan view of the second modified version, with the sliding roof part missing.
Figure 17:
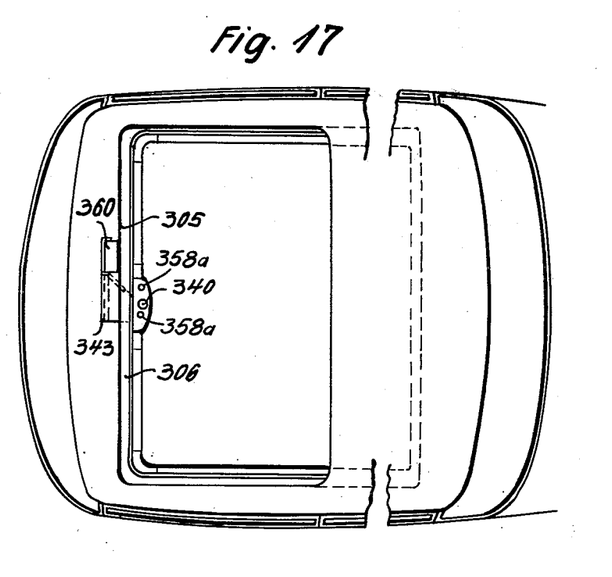
FIGURE 17 is a plan view of the third modified version, but with the sliding roof part missing.

As FIGURES 12, 13, 16 and 17 show, the drive case 240 or 340 is mounted on the forward transverse part 205 or 305 of the fixed roof frame behind the water-collecting gutter 206 or 306. Since at least the drive case is visible when the sliding roof 219 or 319 is opened, as FIGURE 13 or 17 shows, particular care must be taken to ensure that the case is as small and decorative as possible. This statement applies particularly to the construction of the bearing places and the driving wheel 213 or 313, secured to respective spindles 210 or 310. Numeral 330 denotes a screw for spindle 310, similar to that shown at 130 in FIGURE 11.

Hitherto it has been conventional, as shown in FIGURES 1 to 7, to drive the axially-rigid cables 14 and 15 with driving toothed wheels 13 which are constructed in the manner of worm wheels in order to obtain the largest possible contact surface in accordance with the character of the cable. However, in the present embodiment, it is advantageous to construct the gear-wheel 213 or 313 with helical teeth, as shown. It has been found in long-term tests that this kind of toothing is of excellent quality. Even so, in the present embodiment it is still quite possible to construct the gear-wheel 213 or 313 as a worm wheel.

Figure 20:
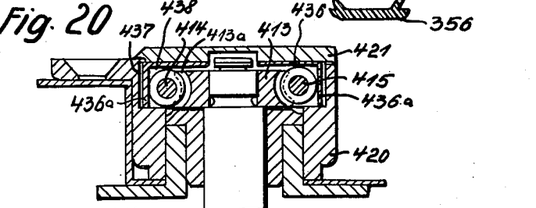
FIGURE 20 is a sectional view through part of a fourth modified version of the vehicle roof.

The case in which the gear-wheel is formed as a worm wheel is shown in FIGURE 20 in which, to permit easy insertion of a worm wheel 413 from below and between two cables 414 and 415, a spring insert 436 is mounted within a case part 420 with its vertical flanges 436a engaging in recesses 437 of the case part 420, the horizontal portion of the insert being securely received in a recess 438 of a case cover 421. When the worm wheel 413 is introduced between the cables 414 and 415, the latter can slide over an upper edge 413a of the wheel 413, yielding laterally for this purpose, and being subsequently pressed into engagement with the worm wheel by means of the insert.

Referring specifically to FIGURES 12 to 15, the helical gear-wheel 213 is mounted on the spindle 210 and is situated immediately above the bearing bush part 234, the upper end of which has an annular flange 235 of larger external diameter than the outside diameter of the toothed wheel 213. The bearing bush 234 itself is fitted into a sleeve-like part 241 of a bearing plate 242. The bearing plate 242 constitutes a top closure for a housing 243. The spindle 210 is mounted in a bearing ring 244 in the housing 243.

Also arranged within the housing 243 is a device for limiting the number of revolutions performed by a hand crank 252 in both directions. This limit device consists of an eccentric 245 fixedly secured to the spindle 210; an eccentric ring 246 having an external toothing 247, which is operated by the eccentric 245; internal toothing 248 which is formed in the housing 243 and engages a portion of the external toothing 247; a stop 251 disposed in an annular recess 250 formed in the housing 243; and a stop 249 provided on the underside of the ring 246 and arranged to travel in the annular recess 250, so that the stop will jam against the stop 251 after a predetermined number of revolutions in either direction have been performed by the hand crank, thereby to prevent further rotation of the hand crank.

Figure 14:
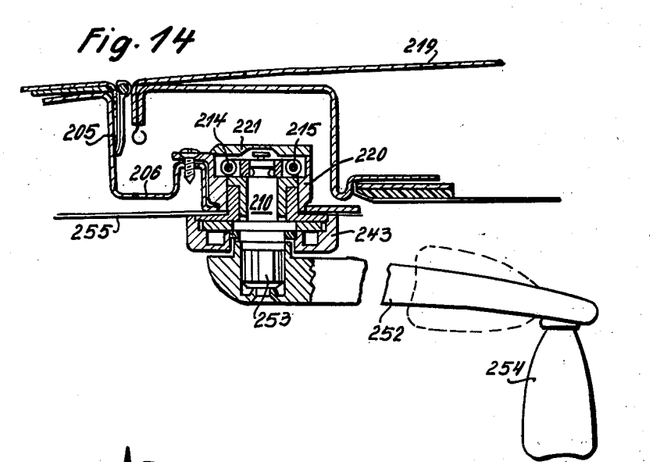
FIGURE 14 is a detail of FIGURE 12, but much enlarged.
Figure 15:
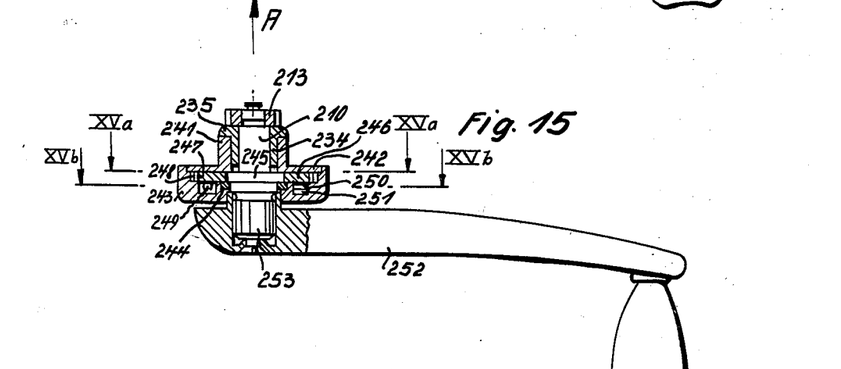
FIGURE 15 is a view similar to FIGURE 14, showing a readily removable part of the second modified version.

The limit structure according to FIGURES 14 and 15 is described in more detail and illustrated in the co-pending and co-assigned patent application Ser. No. 827,482 filed July 16, 1959 by Johannes Werner.

This application has since matured into U. S. Patent No. 2,991,662, issued July 11, 1961.

Figures 15A, 15B:
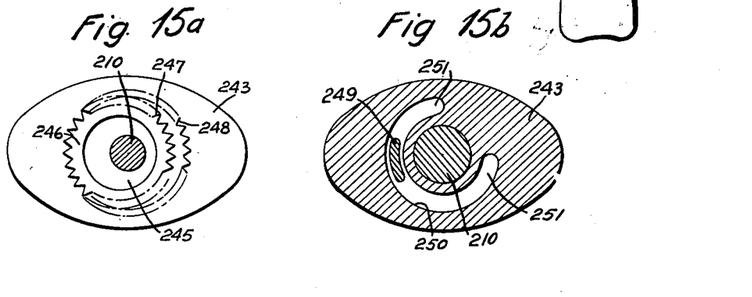
FIGURES 15a and 15b are sectional views taken on the lines XVa—XVa and XVb—XVb, respectively, of FIGURE 15.
Figure 16:
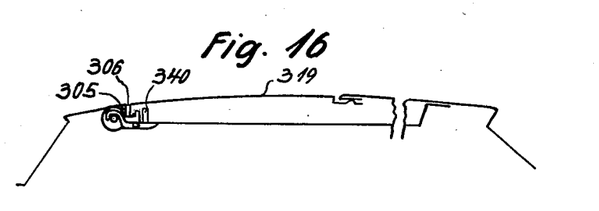
FIGURE 16 is a vertical central, longitudinal, sectional view through a third modified version of the vehicle roof, with a sliding roof part in a closed position.

The sectional views of FIGURES 15a and 15b show the arrangement of the above-described elements of the limit device. Its operation is described in more detail in said co-assigned patent to Johannes Werner.

The hand crank 252 is connected to the spindle 210 by means of teeth 253 on the end of the spindle 210. A handle 254 of the crank 252, as FIGURE 14 shows, is so pivoted to the crank 252 that it can be swung into the position illustrated by chain lines in FIGURE 14, in which the handle 254 occupies an aperture in the hand crank.

All of the parts 210, 213, 234, 235, and 241 to 254 are combined together in a single unit (see particularly FIGURE 15) for insertion in the drive case. After the fitting of the sliding roof 219 and of a fixed roof lining 255, the sliding roof part 219 is brought into its foremost position so that the entire length of its forward edge abuts against the forward transverse part 205. This correctly adjusts the cables 214 and 215 so that the aforementioned single unit can be inserted from below and in the direction of the arrow A, shown in FIGURE 15, into the main case part 220 so as to take up the position shown in FIGURE 14.

Before the unit is inserted in position, the hand crank 252 is rotated relative to the housing 243 into a position which corresponds to the forward end position of the sliding roof. Then from this position the hand crank is turned back through one revolution so that during actual operation, rotation through that final one revolution brings into operation the link devices for the rear roof portion (see FIGURES 8 and 9).

Then, when the hand crank 252 is operated after the insertion of the single unit, the cables 214 and 215 are displaced by the gear-wheel 213, and the sliding roof 219 is opened in the same manner as was explained with reference to FIGURES 1 to 9. At the same time, the eccentric 245 causes the ring 246 to roll within the housing 243, the toothing 247 meshing with toothing 248. The stop 249 travels through the annular recess 250 during this rolling movement of the ring 246 until the stop abuts against one side of the co-operating stop 251. In this way the rearward movement of the sliding roof 219 is limited. When the sliding roof is being closed, the ring 246 is made to rotate in the opposite sense relative to the housing 243. The stop 249 then just reaches the stop 251 when the sliding roof 219 has been lifted into its closed position.

Referring to FIGURES 16 to 19, an automatic drive unit with an electric motor 360 is used instead of the manual drive unit. The construction of the case guiding the cables 314 and 315 and the arrangement of the case on the forward transverse part 305 of the sliding roof frame are shown as being similar to those described in connection with FIGURES 1 to 7 and FIGURES 10 to 15.

The drive unit again includes a toothed wheel 313 which is fitted to one end of the driving spindle 310 by means of serrations 330 provided on the spindle end. The spindle 310 is provided with a bearing flange 348 which has an annular surface 361 bearing on a hollow main driving shaft 362. Arranged on the bearing bush 334 is a bracket 343 which is used in the present version in place of the housing 243. This bracket 343 carries the hollow main driving shaft 362 which encircles the driving spindle 310 and is provided with a worm wheel 363. Furthermore, the bracket 343 carries a driving worm 364, the driving motor 360, and a flexible shaft 365 connecting the worm 364 to the driving motor 360. Thus, the bracket 343 inter-connects all the parts of the drive unit.

Instead of the limit device 245 to 251 shown in FIGURE 15, in this version there is provided a slip clutch which consists substantially of a spring annulus 345 and an adjusting screw 346. The adjusting screw 346 is screwed into the driving spindle 310 and, with its head, presses the spring annulus 345 against the underside 347 of the worm wheel 363. The spring 345 presses the sleeve-like main driving shaft 362 against the flange 348 of the spindle 310 which is rotated owing to the friction produced thereby.

Figure 18:
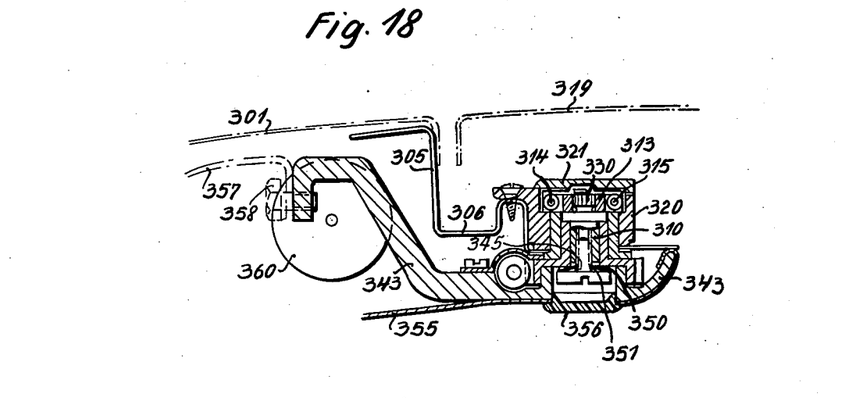
FIGURE 18 is a detail of FIGURE 16, but much enlarged.
Figure 19:
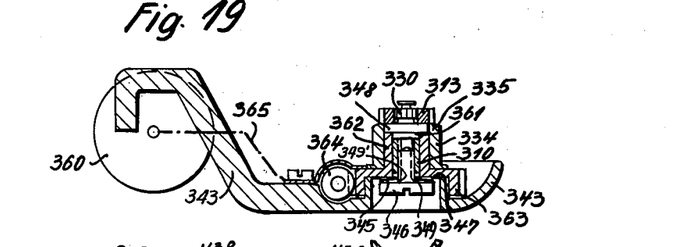
FIGURE 19 is a view similar to FIGURE 18, showing a readily removable part of the third modified version.
Figure 21:
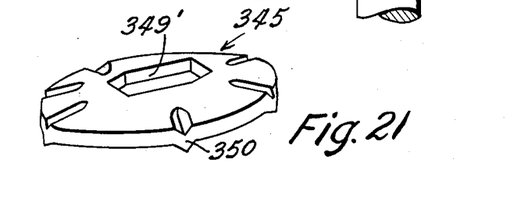
FIGURE 21 is a view of a detail of FIGS. 18 and 19.

As FIGURE 21 shows, the spring annulus 345 is formed with a hexagonal bore, and is placed with this internal hexagon 349[1] on an external hexagon 349 formed on the driving spindle 310 (see FIG. 19). At the same time, the spring annulus 345 is formed at the outer edge with downwardly projecting serrations 350 which engage with corresponding serrations 351 provided on the head of the adjusting screw 346 (see FIG. 18), so that it is not necessary to provide special devices for preventing rotation of the screw 346, and, in addition, the screw 346 can be adjusted very finely in dependence on the spacing of the serrations.

As FIGURE 18 shows, a head lining material 355 is drawn over the entire drive unit. However, in order to permit access at any time to the adjusting screw 346, an aperture is provided in the underside of the bracket 343 and in a corresponding location on the lining 355, this aperture being concealed by a plastic cap 356.

Since the drive unit in this version is relatively heavy, a resilient support 357 can be provided and can extend in the space between a fixed roof part 301 and the roof head lining 355. This support 357 is connected fast at its rear end to the bracket 343 by means of screws 358 or the like. At its front end, the support 357 is fixed to the fixed roof part 301 or to some other fixed part of the vehicle bodywork.

After the drive unit has been securely attached to the resilient support 357, the lining 355 for the fixed roof part is secured to the underside of the bracket 343. When it is desired to adjust the cables 314 and 315, the entire drive unit can be moved, along with the resilient support 357, vertically downwards far enough to pull down the toothed wheel 313 out of engagement with the cables 314 and 315 in order to permit a relative axial adjustment of the cables. The section of the cables extending between the cable connection of the movable roof part and the toothed wheel 313 may be called "active lengths" since they co-operate in shifting the movable roof part into its respective closed and open positions. The cable lengths are independently adjustable whereby a strictly parallel displacement of the sliding roof is insured at all times.

For the adjustment of the cables, it is sufficient to lower the drive unit shown in FIG. 19 by about 5 to 8 millimeters, without having to open the screws 358 interconnecting the bracket 343 with the support 357. The latter is sufficiently resilient to allow a slight bending. It will be understood that the drive unit is supported not only with the screws 358, but also with a pair of substantially vertical screws 358a, the heads of which are seen in FIG. 17, on top of the drive case 340 mounted on the frontal transverse member 305 behind the gutter 306. For disengaging the wheel 313 from the cables 314, 315, the screws 358a may be slightly loosened while maintaining the connection between bracket 343 and support 357. Not even the lining material 355 has to be removed from under the drive unit.

In FIGURE 10, the first modification of the vehicle roof shows the tapped holes 132 into which screws (not shown) similar to those marked 358a in FIGURE 17 are fitted. The unnumbered screw to the left-hand side of the cable 314 in FIGURE 18 serves to secure the drive case 320 and its cover 321 to the transverse part 305.

The adjustment of the cables 314 and 315 is again effected after the sliding roof 319 has been brought into its foremost position. Then the drive unit is raised so that the toothed driving wheel 313 comes into engagement with the cables 314 and 315 and the unit takes up the position shown in FIGURE 18.

To open the sliding roof 319, the electric motor 360 is merely switched on in the proper direction for opening the roof. The drive from the motor 360 is transmitted through the flexible shaft 365 to the worm 364 which then rotates the worm wheel 363 and the main driving shaft 362. The slip clutch 345 to 351 transmits this rotational movement, via the driving spindle 310, to the toothed driving wheel 313 which displaces the cables 314 and 315.

As described in connection with FIGURES 1 to 9, during opening of the sliding roof part, the cables first of all cause the link devices shown in FIGURES 8 and 9 to lower the rear portion of the sliding roof 319. Then the cables displace the sliding roof 319 rearwardly until either the motor 360 is switched off or the guide shoes of the sliding roof 319 abut the rear ends of the guide rails on the frame. If the latter occurrence is the case, the motor 360 is protected by the slip clutch 345 to 351 which will immediately come into operation so that the motor continues to drive the worm wheel 363 and the main driving shaft 362 whilst the driving spindle 310 carrying the toothed wheel 313 remains stationary.

To close the sliding roof, the driving motor 360 is merely switched on in the direction for closing the sliding roof. The wheel 313 is then simply driven through the agency of the slip clutch 345 to 351 in the opposite direction of rotation and the cables 314 and 315 are displaced in their respective opposite directions. After a time, the sliding roof 319 abuts the forward transverse frame part 305, whereupon the link devices shown in FIGURES 8 and 9 lift the rear portion of the sliding roof part 319. As soon as the sliding roof 319 is completely raised, further movement of the cables 314 and 315 is impossible, so that the slip clutch 345—351 again operates and the motor then only drives the worm wheel 363 and the main driving shaft 362, whilst the driving spindle 310 with the toothed wheel 313 remains stationary.

In the versions described with reference to the drawings, it will be seen that the driving device is, in each version, disposed at a fixed location directly below the closed position of the movable roof part.

In those versions the cables 14 and 15, 114 and 115, 214 and 215, or 314 and 315 are constructed as helically wound cables. However, it is also possible to provide toothed cables of another kind, for example to arrange on a cable core toothing in the form of attached rows of beads or the like. The individual teeth can then extend, for example, in the form of rings about the cable periphery.

Although the present cables are preferably of the axially movable kind, a kind of cable which is rotatable and is not axially movable could be used instead, the latter kind having recesses in which engage corresponding projections on the guide shoes of the sliding roof part.

The present arrangement has the advantage over known arrangements in that it is possible to bring the circle traced by the outermost part of the hand crank out of the region of the fittings on the forward portions of the fixed roof part so that unhindered operation of the hand crank is possible at any time. For motor-operated driving devices, so much room is obtained by this arrangement that such devices can be attached as has been seen, to the rear portions of the front transverse part of the frame.

Further advantages are afforded by the simplification and cheapening of the fitting process since little or nothing of the conventional head-lining and the forward part of the fixed roof part needs to be altered to permit mounting of the driving device, and, more particularly, it is not necessary to arrange a special supporting frame for the driving device. In addition, the cable guides can be made shorter and, above all, can be placed in easily accessible positions. In the case of aperture frames having rain gutters, the cable guides need no longer extend in a water-tight manner through the forward rain gutter, but can always remain on the side of the forward rain gutter facing the roof aperture.

The present arrangement has the extra advantage that the sliding roof part is more free to receive glass, especially since the locking means usually provided in sliding roofs which are operated directly by hand are dispensed with, together with the handle necessary for the operation thereof. Furthermore, in every case, including that of vehicles having folding roofs instead of rigid roofs, the advantage is afforded that conversion of a sliding roof operated by a hand crank to an automatically operated sliding roof is extremely simple in that, by arranging an appropriate driving motor, for example in the luggage compartment of the vehicle, the sliding roof part and the fixed roof part do not have to be modified in any way. Conversion is carried out without difficulty by replacing the driving cables and fitting the automatic drive.

The drive case, together with the guide pieces, can be kept so flat that it does not exceed the maximum dimension of the lining bar, made of light metal or the like, which is generally arranged on the forward transverse part of the aperture frame, so that the head space available for the occupants of the vehicle need not be lessened by enlarging the overall frame height.

We claim:

1. A vehicle roof comprising a fixed roof part, portions of said fixed roof part defining an aperture therein and a forwardly transverse member, a rain gutter on said transverse member extending transversely to the vehicle roof, roof guide means disposed at opposite sides of said aperture and extending in the longitudinal direction of the vehicle roof, a movable roof part having the form of a rigid slidable roof and adapted to be displaced along said roof guide means in said longitudinal direction between on open position and a closed position forward of said open position, said movable roof part completely covering said aperture in said closed position, driving means disposed at a fixed location adjacent the foremost side of said aperture, said location being directly below said movable roof part when the latter is in said closed position, means at said location securing said driving means to said portions defining the aperture, cable means rigid to axial force, engaged by said driving means and extending between said location and two respective locations on opposite sides of said movable roof part that are adjacent said roof guide means, for transmitting driving force from said driving means to said movable roof part, said cable means including portions formed with recesses, a driving wheel constituting part of said driving means and adapted to apply said force to said cable means, said driving wheel comprising peripheral teeth portions engaging said recesses in said cable means for causing axial displacement of said cable means in order to displace said movable roof part, a driving spindle also constituting part of said driving means and being fixed coaxially to said driving wheel for rotation thereof, means at said two respective locations connecting said cable means to said movable roof part, cable guide means connected to said fixed roof part for guiding said cable means between said two respective locations on the one hand and said fixed location on the other hand, parts of said cable guide means mounted on said aperture defining portions of the fixed roof part adjacent the foremost side of said aperture and on opposite sides of said driving means for guiding said cable means toward and away from said driving wheel, a drive case situated at said location, said driving wheel being mounted in said drive case in a plane substantially parallel to that of said movable roof part, portions of said drive case forming part of said cable guide means and defining ducts in said drive case for guiding said cable means past said driving wheel, further portions of said drive case defining a hole through which extends said spindle, the axis of said spindle being substantially perpendicular to the plane of said movable roof part, said drive case comprising a main drive case part and a drive case cover on the latter, releasable securing means connecting said main drive case part and said drive case cover, said portions of the drive case defining guide ducts being provided between said main drive case part and said drive case cover whereby said cable means are guided past diametrically opposite peripheral teeth portions of said first driving wheel, said drive case being made of a casting of corrosion-resistant light metal, a liner of hard material being mounted in said guide ducts about said driving wheel for preventing wear of said drive case by the cable means, and said liner being constituted by a metal strip in the shape of an inverted trough without end walls.

2. A vehicle roof as claimed in claim 1, further comprising side wall portions of said main drive case part on opposite sides of the axis of said driving wheel, defining recesses in the inner surface of said main drive case part for receiving the side walls of said metal strip, and portions of said drive case cover defining a recess in the lower surface thereof for receiving the base wall of said metal strip.

3. A vehicle roof comprising a fixed roof part, portions of said fixed roof part defining an aperture therein and a forwardly transverse member, a rain gutter on said transverse member extending transversely to the vehicle roof, roof guide means disposed at opposite sides of said aperture and extending in the longitudinal direction of the vehicle roof, a movable roof part having the form of a rigid slidable roof and adapted to be displaced along said roof guide means in said longitudinal direction between an open position and a closed position forward of said open position, said movable roof part completely covering said aperture in said closed position, driving means disposed at a fixed location adjacent the foremost side of said aperture, said location being directly below said movable roof part when the latter is in said closed position, means at said location securing said driving means to said portions defining the aperture, cable means rigid to axial force, engaged by said driving means and extending between said location and two respective locations on opposite sides of said movable roof part that are adjacent said roof guide means, for transmitting driving force from said driving means to said movable roof part, said cable means including portions formed with recesses, a driving wheel constituting part of said driving means and adapted to apply said force to said cable means, said driving wheel comprising peripheral teeth portions engaging said recesses in said cable means for causing axial displacement of said cable means in order to displace said movable roof part, a driving spindle also constituting part of said driving means and being fixed coaxially to said driving wheel for rotation thereof, means at said two respective locations connecting said cable means to said movable roof part, cable guide means connected to said fixed roof part for guiding said cable means between said two respective locations on the one hand and said fixed location on the other hand, parts of said cable guide means mounted on said aperture defining portions of the fixed roof part adjacent the foremost side of said aperture and on opposite sides of said driving means for guiding said cable means toward and away from said driving wheel, a drive case situated at said location, said driving wheel being mounted in said drive case in a plane substantially parallel to that of said movable roof part, portions of said drive case forming part of said cable guide means and defining ducts in said drive case for guiding said cable means past said driving wheel, further portions of said drive case defining a hole through which extends said spindle, the axis of said spindle being substantially perpendicular to the plane of said movable roof part, a bush bearing mounted in said hole co-axially with the latter for maintaining said spindle in position, hard metal portions of said bush bearing forming an outwardly-projecting annular flange in the proximity of one of the radial surfaces of said driving wheel, and said annular flange extending radially to locations at a distance from the driving-wheel axis greater than the shortest distance between the cable axes and the driving-wheel axis.

4. A vehicle roof as claimed in claim 3, wherein said annular flange is formed with blunt edges at its outer periphery.

5. A vehicle roof as claimed in claim 4, further comprising separate means connecting said driving spindle to said driving wheel, portions of said drive case defining guide ducts for said cable means, a hard metal liner in the shape of an inverted trough without end walls being mounted in said guide ducts, portions of the base of said hard metal liner defining a second hole through which extends said separate means.

6. A vehicle roof comprising a fixed roof part, portions of said fixed roof part defining an aperture therein and a forwardly transverse member, a rain gutter on said transverse member extending transversely to the vehicle roof, roof guide means disposed at opposite sides of said aperture and extending in the longitudinal direction of the vehicle roof, a movable roof part having the form of a rigid slidable roof and adapted to be displaced along said roof guide means in said longitudinal direction between an open position and a closed position forward of said open position, said movable roof part completely covering said aperture in said closed position, driving means disposed at a fixed location adjacent the foremost side of said aperture, said location being directly below said movable roof part when the latter is in said closed position, means at said location securing said driving means to said portions defining the aperture, cable means rigid to axial force, engaged by said driving means and extending between said location and two respective locations on opposite sides of said movable roof part that are adjacent said roof guide means, for transmitting driving force from said driving means to said movable roof part, said cable means including portions formed with recesses, a driving wheel constituting part of said driving means and adapted to apply said force to said cable means, said driving wheel comprising peripheral teeth portions engaging said recesses in said cable means for causing axial displacement of said cable means in order to displace said movable roof part, a driving spindle also constituting part of said driving means and being fixed coaxially to said driving wheel for rotation thereof, means at said two respective locations connecting said cable means to said movable roof part, cable guide means connected to said fixed roof part for guiding said cable means between said two respective locations on the one hand and said fixed location on the other hand, parts of said cable guide means mounted on said aperture defining portions of the fixed roof part adjacent the foremost side of said aperture and on opposite sides of said driving means for guiding said cable means toward and away from said driving wheel, a drive case situated at said location, said driving wheel being mounted in said drive case in a plane substantially parallel to that of said movable roof part, portions of said drive case forming part of said cable guide means and defining ducts in said drive case for guiding said cable means past said driving wheel, further portions of said drive case defining a hole through which extends said spindle, the axis of said spindle being substantially perpendicular to the plane of said movable roof part, a bush bearing mounted in said hole co-axially with said spindle for maintaining the latter in position, said bush bearing and said driving means forming a unit detachable from said drive case using said hole of the drive case, for adjustment and repair of the interconnected cable means.

7. A vehicle roof as claimed in claim 6, wherein the axes of said driving spindle and of said driving wheel are substantially vertical, and said hole is formed in the bottom wall of said drive case.

8. A vehicle roof comprising a fixed roof part, portions of said fixed roof part defining an aperture therein and a forwardly transverse member, a rain gutter on said transverse member extending transversely to the vehicle roof, roof guide means disposed at opposite sides of said aperture and extending in the longitudinal direction of the vehicle roof, a movable roof part having the form of a rigid slidable roof and adapted to be displaced along said roof guide means in said longitudinal direction between an open position and a closed position forward of said open position, said movable roof part completely covering said aperture in said closed position, driving means disposed at a fixed location adjacent the foremost side of said aperture, said location being directly below said movable roof part when the latter is in said closed position, means at said location securing said driving means to said portions defining the aperture, cable means rigid to axial force, engaged by said driving means and extending between said location and two respective locations on opposite sides of said movable roof part that are adjacent said roof guide means, for transmitting driving force from said driving means to said movable roof part, said cable means including portions formed with recesses, a driving wheel constituting part of said driving means and adapted to apply said force to said cable means, said driving wheel comprising peripheral teeth portions engaging said recesses in said cable means for causing axial displacement of said cable means in order to displace said movable roof part, a driving spindle also constituting part of said driving means and being fixed coaxially to said driving wheel for rotation thereof, means at said two respective locations connecting said cable means to said movable roof part, cable guide means connected to said fixed roof part for guiding said cable means between said two respective locations on the one hand and said fixed location on the other hand, parts of said cable guide means mounted on said aperture defining portions of the fixed roof part adjacent the foremost side of said aperture and on opposite sides of said driving means for guiding said cable means toward and away from said driving wheel, a hand crank forming part of said driving means and being connected to said driving spindle for driving the latter, said crank having hub portions connected to said spindle, a fixed housing encircling said hub portions and connected to said transverse member for maintaining said hand crank in position, and a bush bearing connected to said housing for journaling said spindle.

9. A vehicle roof as claimed in claim 8, further comprising stop means mounted within said housing for limiting the number of revolutions that can be performed by said crank in both the clockwise and the anti-clockwise directions, said stop means consisting of an eccentric radial flange fixed to said spindle and situated within said housing, a ring mounted in said housing concentrically with said eccentric radial flange, said ring having outer peripheral teeth portions, said housing having internal teeth portions formed concentrically with the axis of said spindle and co-operating with said outer peripheral teeth portions, a stop provided on one of the radial faces of said ring, and a second stop provided on the inside of said housing adjacent said ring for co-operation with the first-mentioned stop, adapted to limit the number of revolutions of said hand crank.

10. A vehicle roof comprising a fixed roof part, portions of said fixed roof part defining an aperture therein and a forwardly transverse member, a rain gutter on said transverse member extending transversely to the vehicle roof, roof guide means disposed at opposite sides of said aperture and extending in the longitudinal direction of the vehicle roof, a movable roof part having the form of a rigid slidable roof and adapted to be displaced along said roof guide means in said longitudinal direction between an open position and a closed position forward of said open position, said movable roof part completely covering said aperture in said closed position, driving means disposed at a fixed location adjacent the foremost side of said aperture, said location being directly below said movable roof part when the latter is in said closed position, means at said location securing said driving means to said portions defining the aperture, cable means rigid to axial force, engaged by said driving means and extending between said location and two respective locations on opposite sides of said movable roof part that are adjacent said roof guide means, for transmitting driving force from said driving means to said movable roof part, said cable means including portions formed with recesses, a driving wheel constituting part of said driving means and adapted to apply said force to said cable means, said driving wheel comprising peripheral teeth portions engaging said recesses in said cable means for causing axial displacement of said cable means in order to displace said movable roof part, a driving spindle also constituting part of said driving means and being fixed co-axially to said driving wheel for rotation thereof, means at said two respective locations connecting said cable means to said movable roof part, cable guide means connected to said fixed roof part for guiding said cable means between said two respective locations on the one hand and said fixed location on the other hand, parts of said cable guide means mounted on said aperture defining portions of the fixed roof part adjacent the foremost side of said aperture and on opposite sides of said driving means for guiding said cable means toward and away from said driving wheel, said movable roof part being displaceable between said open and said closed positions via an almost-closed position just below said closed position, said open position being situated at least partly below said fixed roof part, said roof guide means comprising two guide rails mounted at opposite sides of said aperture and extending in the longitudinal direction of the vehicle roof, said connecting means at said two respective locations taking the form of link devices, on the one hand for connecting said cable means to the rear of the movable roof part, and on the other hand for lifting and lowering said movable roof part between said almost-closed and said closed positions, said link devices comprising two guides shoes mounted on the respective guide rails and connected to the respective cable means for sliding along said guide rails, two pivot pins extending transverse to the vehicle roof and being connected to the respective guide shoes, two link members each mounted on one end of an associated pivot pin for swinging about the axis of said pin, two further pivot pins each mounted on the other end of an associated link member and connected at opposite sides to the rear of said movable roof part for taking up dead-centre positions with respect to and forward of said first-mentioned pivot pins when said movable roof part is in said open position, and actuating means for causing movement of said further pins out of said dead-centre positions.

11. A vehicle roof as claimed in claim 10, wherein said actuating means comprises a ramp disposed below said movable roof part for raising the latter, and a camming track carried by said movable roof part for co-operating with said ramp.

12. A vehicle roof comprising a fixed roof part, a fixed roof frame part secured to said fixed roof part, lateral and frontal portions of said fixed frame part defining an aperture therein, said frontal portions constituting a forwardly transverse member, a flange forming a rearward part of said transverse member extending transvesely to the vehicle roof substantially in a horizontal plane, roof guide means formed of metallic profiles disposed at opposite sides of said aperture rigidly attached to said fixed frame part and extending along the vehicle roof, a rain gutter formed in said lateral and frontal portions of the fixed roof frame part and having a frontal section in front of said flange and lateral sections extending along the vehicle roof, said flange extending just behind said rain gutter, a rigid slidable roof part adapted to be displaced along said roof guide means between an open position and a closed position forward of said open position, said slidable roof part completely covering said aperture in said closed position, driving means disposed at a fixed location adjacent the foremost side of said aperture, said fixed location being directly below said slidable roof part when the latter is in said closed position, cable means mounted rigid to axial forces, engaged by said driving means and extending between said fixed location and two respective locations on opposite sides of said slidable roof part that are adjacent said roof guide means for transmitting driving force from said driving means to said slidable roof part to which said cable means are connected with respective end portions, a driving wheel constituting part of said driving means, having a substantially vertical axis and adapted to apply said force to said cable means, a driving spindle also constituting part of said driving means and being fixed coaxially to said driving wheel for rotation thereof, a drive case secured to said flange for lodging a part of said driving means including said driving wheel and said driving spindle, said drive case being substantially aligned with the cooperating portions of said cable means and comprising an elongated main drive case part and an elongated drive case cover on the latter, releasable securing means connecting said main drive case part and said drive case cover, portions of said drive case defining hollow guide ducts provided between said main drive case part and said drive case cover whereby said cable means entering said drive case in pairs from opposite ends are guided in the same horizontal plane past diametrically opposite peripheral teeth portions of said driving wheel, cable guide means connected to said fixed frame part on the lateral and frontal portions of said aperture for guiding said cable means between said two respective locations on the one hand and said fixed location on the other hand, lateral portions of said cable guide means being located on those sides of said lateral rain gutter sections which are closer to said aperture and serving as means for guiding said slidable roof part, parts of said cable guide means mounted on said aperture-defining portions of the fixed frame part adjacent the foremost side of said aperture and on opposite sides of said driving means for guiding said cable means toward and away from said driving wheel, said flange carrying said driving means and said parts of the cable guide means; said cable means, said driving wheel, said driving spindle and said cable guide means being located within a region of said vehicle roof limited outwardly by said frontal and lateral rain gutter sections.

13. A vehicle roof as claimed in claim 12, further comprising an electric motor forming part of said driving means and connected to said driving spindle for driving the latter, a bracket connected to said fixed frame part and supporting said motor, a bush bearing mounted coaxially with said driving spindle and connected to said bracket for maintaining said driving spindle in position, and a speed reduction gear interposed between said motor and said spindle.

14. A vehicle roof as claimed in claim 12, further comprising a bracket releasably attached to the underside of said transverse member and protruding forwardly under said fixed roof part, said driving means including an electric motor supported by said bracket, further comprising speed reducing means interposed between said driving means and said driving wheel, a resilient support member attached to said fixed frame part on one end and to said bracket on the other, and releasable connecting means between said support member and said bracket.

15. A vehicle roof as claimed in claim 14, further comprising a slip clutch forming part of said driving means and interposed between said motor and said spindle, said clutch adapted to prevent the transmission of greater than a predetermined torque to said driving wheel.

16. A vehicle roof comprising a fixed roof part, portions of said fixed roof part defining an aperture therein and a forwardly transverse member, guide rails disposed at opposite sides of said aperture and extending in the longitudinal direction of the vehicle roof, a movable roof part having the form of a rigid slidable roof and adapted to be displaced along said guide rails in said longitudinal direction between an open position and a closed position forward of said open position via an almost-closed position just below said closed position, said movable roof part completely covering said aperture in said closed position, driving means disposed at a fixed location adjacent the foremost side of said aperture, means at said location securing said driving means to said aperture-defining portions, cable means rigid to axial force, engaged by said driving means and extending between said location and two respective locations on opposite sides of said movable roof part that are adjacent said guide rails, for transmitting driving force from said driving means to said movable roof part, said driving means causing axial displacement of said cable means in order to displace said movable roof part, means at said two respective locations connecting said cable means to said movable roof part and having the form of link devices, on the one hand for connecting said cable means to the rear of said movable roof part, and on the other hand for lifting and lowering said movable roof part between said almost-closed and said closed positions, said link devices comprising two guide shoes mounted on the respective guide rails and connected to the respective cable means for sliding along said guide rails, two pivot pins extending transverse to the vehicle roof and being connected to the respective guide shoes, two link members each mounted on one end of an associated pivot pin for swinging about the axis of said pin, two further pivot pins each mounted on the other end of an associated link member and connected at opposite sides to the rear of said movable roof part for taking up dead-centre positions with respect to and forward of said first-mentioned pivot pins when said movable roof part is in said open position, and actuating means for causing movement of said further pins out of said dead-centre positions.

17. A vehicle roof as claimed in claim 16, wherein said actuating means comprises a ramp disposed below said movable roof part for raising the latter, and a camming track carried by said movable roof for co-operating with said ramp.

(References on following page)

References Cited in the file of this patent

UNITED STATES PATENTS

| | | |
|---|---|---|
| 1,584,198 | Stevens | May 11, 1926 |
| 2,156,615 | Bishop | May 2, 1939 |
| 2,201,330 | Vernig et al. | May 21, 1940 |
| 2,652,245 | Bentley | Sept. 15, 1953 |
| 2,771,268 | Rosewall | Nov. 20, 1956 |
| 2,774,624 | Lower | Dec. 18, 1956 |
| 2,985,483 | Bishop et al. | May 23, 1961 |

FOREIGN PATENTS

| | | |
|---|---|---|
| 1,012,834 | Germany | July 25, 1957 |
| 334,113 | Great Britain | Aug. 28, 1930 |
| 446,236 | Great Britain | Apr. 27, 1936 |